United States Patent
Macquet

(10) Patent No.: US 9,678,339 B2
(45) Date of Patent: Jun. 13, 2017

(54) DISPLAY, IN PARTICULAR FOR A MOTOR VEHICLE

(71) Applicant: Johnson Controls Automotive Electronics SAS, Cergy Pontoise (FR)

(72) Inventor: Eric Macquet, Saint Leu La Forêt (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/419,918

(22) PCT Filed: Aug. 5, 2013

(86) PCT No.: PCT/EP2013/066384
§ 371 (c)(1),
(2) Date: Feb. 5, 2015

(87) PCT Pub. No.: WO2014/023690
PCT Pub. Date: Feb. 13, 2014

(65) Prior Publication Data
US 2015/0241693 A1  Aug. 27, 2015

(30) Foreign Application Priority Data
Aug. 6, 2012 (FR) .................................. 12 02193

(51) Int. Cl.
*G02B 27/01* (2006.01)

(52) U.S. Cl.
CPC ..... *G02B 27/0101* (2013.01); *G02B 27/0149* (2013.01); *G02B 2027/0154* (2013.01);
(Continued)

(58) Field of Classification Search
CPC ............ G02B 27/0101; G02B 27/0149; G02B 2027/0154; G02B 2027/0156; G02B 2027/0159; G02B 2027/0181
(Continued)

(56) References Cited

U.S. PATENT DOCUMENTS 5,059,956 A * 10/1991 Iino ........................ B60K 35/00
                                                         340/980
5,204,666 A *  4/1993 Aoki ...................... B60K 37/02
                                                         340/980
(Continued)

FOREIGN PATENT DOCUMENTS

EP     2 477 058 A2    7/2012
EP     2 479 598 A1    7/2012
(Continued)

OTHER PUBLICATIONS

International Preliminary Report on Patentability and Written Opinion of the International Searching Authority in PCT/EP2013/066384 dated Feb. 19, 2015, 8 pages.
Search Report in French priority application No. 12/02193 dated Apr. 8, 2013, 7 pages.
International Search Report in PCT/EP2013/066384 dated Nov. 4, 2013, 3 pages.

*Primary Examiner* — Bumsuk Won
*Assistant Examiner* — Grant Gagnon
(74) *Attorney, Agent, or Firm* — Foley & Lardner LLP

(57) ABSTRACT

A display, in particular for a motor vehicle, includes a projection module for generating an image in order to project it in the normal viewing direction of a user of the display, along an optical path. The display also includes a reflecting and/or displaying element, which is movable between various display positions. The display also includes a holder for the reflecting and/or displaying element. The holder can be moved vertically between various positioning states.

4 Claims, 2 Drawing Sheets

(52) U.S. Cl.
CPC ............... *G02B 2027/0156* (2013.01); *G02B 2027/0159* (2013.01); *G02B 2027/0181* (2013.01)

(58) Field of Classification Search
USPC ......................................... 359/630
See application file for complete search history.

(56) References Cited

U.S. PATENT DOCUMENTS

| | | | | |
|---|---|---|---|---|
| 5,646,639 | A * | 7/1997 | Koie | G02B 27/01 340/920 |
| 8,289,229 | B2 * | 10/2012 | Ishikawa | G02B 27/0101 345/7 |
| 8,878,843 | B2 * | 11/2014 | Koga | B60K 35/00 345/418 |
| 2006/0203351 | A1 * | 9/2006 | Kageyama | G02B 27/0101 359/630 |
| 2013/0235454 | A1 * | 9/2013 | Hopf | B60R 11/0235 359/446 |

FOREIGN PATENT DOCUMENTS

| | | |
|---|---|---|
| WO | WO-2007057608 A1 | 5/2007 |
| WO | WO-2012035134 A1 | 3/2012 |

* cited by examiner

DISPLAY, IN PARTICULAR FOR A MOTOR VEHICLE

CROSS REFERENCE TO RELATED APPLICATIONS

The present application is a U.S. National Stage of International Application No. PCT/EP2013/066384 filed on Aug. 5, 2013, which claims the benefit of French Patent Application No. 12/02193 filed on Aug. 6, 2012, the entire disclosures of all of which are incorporated herein by reference.

The present invention concerns a display, in particular for a motor vehicle.

Head up displays (HUD) are known, in particular involving the projection of an image towards a windscreen, as described in document U.S. Pat. No. 5,214,413, or towards a reflecting element.

Head up displays allow information to be projected in the field of vision of the area in front of the motor vehicle so that the driver of the vehicle can read this information without his eyes leaving the area in front of the motor vehicle. At the same time, the information can be read without the driver having to change the adjustment of his eyes.

Having regard for the needs of the user of the vehicle, it is advantageous if the reflecting element can be used with several positions of the head (or the eyes) of the user of the vehicle.

One drawback of such devices in the prior art is the fact that the display is capable of being located in different positions, resulting in the need for a relatively large amount of room to accommodate the control or positional changing mechanism.

The particular aim of the present invention is to overcome the drawbacks in the prior art and, in particular, those quoted above, as well as proposing a head up display having a reflecting and/or displaying element which can be controlled such that it can be adjusted to different heights of the user's head wherein the display comprises a mechanism having high stability and an extended service life despite frequent usage.

According to the present invention, this aim is achieved by a display, in particular for a motor vehicle, including a projection module (11) for generating an image in order to project same in the normal viewing direction (15) of a user of said display (10), along an optical path (12), said display (10) including a reflecting and/or displaying element (13), said reflecting and/or displaying element (13) movable between a plurality of various display positions, the display (10) including a holder for the reflecting and/or displaying element (13), such that the holder can be moved vertically between various positioning states.

According to an embodiment of a display in this form, it is advantageously possible to arrange the movement mechanism of the reflecting element in a simple and stable manner and in such a way that it can be accomplished in a relatively small space.

Another preferred improvement of the invention rests in the fact that the reflecting and/or displaying element (13) can be positioned, in addition to the plurality of various display positions, in a rest position, the rest position of the reflecting and/or displaying element (13) corresponding to a rest positioning state for the holder for the reflecting and/or displaying element (13).

According to an embodiment of a display in this form, it is advantageously possible to eliminate or at least reduce the risk of damage to the reflecting element when it is in its rest position.

Another preferred improvement of the invention rests in the fact that, between the different displaying positions of the reflecting and/or displaying element (13), the reflecting and/or displaying element (13) is subject to a rotational movement around an axis of rotation which is integral with the holder for the reflecting and/or displaying element (13).

According to an embodiment of a display in this form, it is advantageously possible to provide for the movement of the reflecting and/or displaying element in a simply and mechanically stable manner.

According to one alternative version of the invention, it is also possible that either the reflecting and/or displaying element or the holder for the reflecting and/or displaying element or the reflecting and/or displaying element and the holder for the reflecting and/or displaying element is/are rotated around a rotational axis by means of a rotating motor element and by means of a transmission element.

A preferred improvement of the invention rests in the fact that the rotational axis of the reflecting and/or displaying element is a physical axis.

A preferred improvement of the invention rests in the fact that the display comprises a means of covering the reflecting and/or displaying element, wherein the covering means covers the reflecting and/or displaying element when it is located in its rest position.

According to an embodiment of a display in this form, it is advantageously possible to eliminate or at least reduce the risk of damage to the reflecting element even more when it is in its first rest position.

Other features and advantages of the invention will emerge from a reading of the description below of one particular non-limiting embodiment of the present invention.

BRIEF DESCRIPTION OF THE DRAWINGS

The invention will be understood better by means of the description below which refers to preferred means of achieving it, data provided as non-limiting examples and explained with references to the attached diagrammatic drawings, in which.

DESCRIPTION OF THE DRAWINGS

Figure 1:
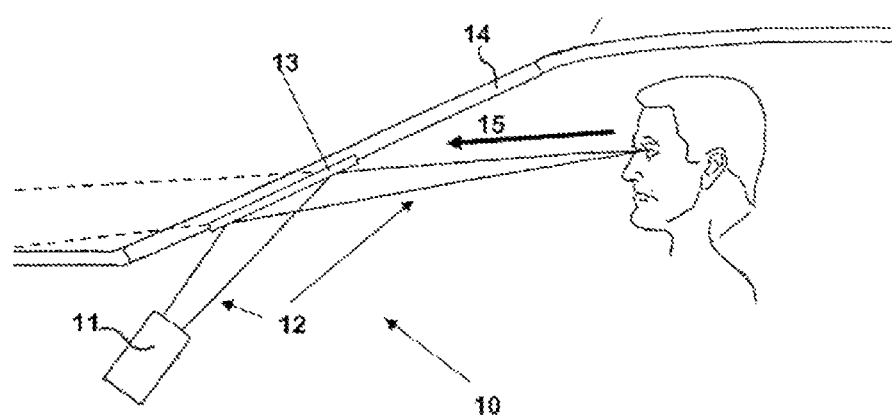
FIG. 1 is a diagrammatic section through a display according to the present invention.
Figure 2:
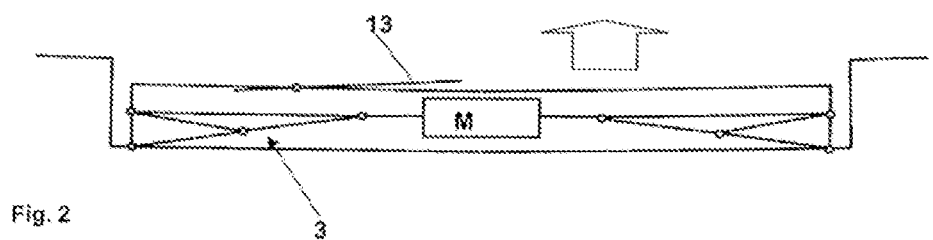
FIG. 2 is a diagrammatic view of a reflecting and/or displaying element of a display according to the present invention.

As shown in FIG. 1 of the drawings attached, a display 10 according to the present invention comprises a projection module 11 that generates an image in the normal viewing direction 15 of a user of said display 10 along an optical path 12.

Normally, the optical path 12 comprises at least one reflecting and/or displaying element 13. In this arrangement, the optical path 12 can comprise one reflecting element (single), as represented in FIG. 1. However, the optical path 12 can also comprise two reflecting elements. The display 10 can be made with either a reflecting element 13 or with a displaying element (for example, as a thin film transistor—"TFT"), or with a reflecting and/or displaying element.

The normal viewing direction 15 is the viewing direction of a user of the display 10, in particular the driver of a vehicle, when he is looking, in particular, through a windscreen 14 at the exterior situated in front of the vehicle.

According to the present invention, the reflecting and/or displaying element 13 is an element located at a distance from the windscreen 14. According to one preferred embodiment of the present invention, the reflecting and/or displaying element 13 can be positioned in a rest position and in a displaying position. When the reflecting and/or displaying element 13 is positioned in its rest position, the reflecting and/or displaying element 13 is pointed, for example, so as to be approximately horizontal, and when the reflecting and/or displaying element 13 is positioned in its displaying position, the reflecting and/or displaying element 13 is positioned typically upright or approximately vertically such that the user of the display is able to look through the reflecting and/or displaying element 13. However, it is also possible and preferable according to the invention that, when the reflecting and/or displaying element 13 is positioned in its rest position, the reflecting and/or displaying element 13 is pointed approximately vertically and that the change of position from the rest position to the displaying position of the reflecting and/or displaying element 13 is accomplished by means of a translation movement.

The different positions of the reflecting and/or displaying element 13 correspond to displaying positions that are adjusted to different heights of the head of the user. That implies that the total angle through which the reflecting and/or displaying element 13 can vary between the different displaying positions is contained within a relatively reduced range of a few degrees or about 10 to 15 degrees, in particular 2° to 20°, preferably 4° to 10°. The reflecting and/or displaying element 13 is driven by a motor element M, either directly or through a transmission element 3. The motor element M may be, in particular, a linear motor element or a rotating motor element, in particular an electric stepping motor element.

The change of position of the reflecting and/or displaying element 13 can be voice-activated, in other words, by means of an acoustic signal. For this purpose, the display may comprise or be linked to a voice recognition device. Whenever a voice recognition device of this type recognises a particular driver (or user) of the vehicle, the reflecting element 13 can be positioned in the display position ideally suited for the driver from the positions in its memory.

According to the present invention, a holding element or holder is connected to the reflecting and/or displaying element 13. The holder or holding element can be moved vertically between different positioning states, in particular by means of the transmission element 3. The reflecting and/or displaying element 13 of the display 10 can be made to rotate around a rotational axis D by the motor element M, which can be a linear motor element or a rotating motor element operating with a transmission element in the form of a worm gear drive.

LIST OF REFERENCES

3 Transmission element
10 Display
11 Projection module
12 Optical path
13 Reflecting and/or displaying element
14 Windscreen
15 Normal viewing direction

The invention claimed is:

1. A display for a motor vehicle, comprising:
    a projection module for generating an image in order to project same in a normal viewing direction of a user of said display, along an optical path;
    a reflecting and/or displaying element, said reflecting and/or displaying element movable between a plurality of various display positions; and
    a holder for the reflecting and/or displaying element, wherein the holder can be moved vertically between various positioning states, wherein the reflecting and/or displaying element can be positioned, in addition to the plurality of various display positions, in a rest position, the rest position of the reflecting and/or displaying element corresponding to a rest positioning state for the holder for the reflecting and/or display element, wherein between the different displaying positions of the reflecting and/or displaying element, the reflecting and/or displaying element is subject to a rotational movement around an axis of rotation which is integral with the holder for the reflecting and/or displaying element, wherein when the reflecting and/or displaying element is positioned in its rest position, the reflecting and/or displaying element is pointed so as to be approximately horizontal, and when the reflecting and/or displaying element is positioned in its displaying position, the reflecting and/or displaying element is positioned approximately vertically;
    wherein the reflecting and/or display element is driven by a motor element, either directly or through a transmission element, wherein the holder is connected to the reflecting and/or display element, wherein the holder is movable between the different positioning states by the transmission element, wherein the transmission element is a worm gear; and
    wherein the display comprises or is linked to a voice recognition device, wherein a change of a position of the reflecting and/or displaying element is voice-activated, wherein whenever the voice recognition device of this type recognizes a particular driver or user of the vehicle, the reflecting element is positioned in the display position ideally suited for the particular driver or user of the vehicle, wherein ideally suited positions are stored in memory.

2. A display according to claim 1, further comprising a cover for the reflecting and/or displaying element, wherein the cover covers the reflecting and/or displaying element when it is located in its rest position.

3. A display according to claim 1, wherein the reflecting and/or displaying element is/are rotated around a rotational axis by a rotating motor element and by a transmission element.

4. A display according to claim 3, wherein the rotational axis of the reflecting and/or displaying element is a physical axis.

* * * * *